United States Patent
Baur (10) Patent No.: US 12,403,834 B2
(45) Date of Patent: Sep. 2, 2025

(54) VEHICULAR DRIVER MONITORING SYSTEM WITH CAMERA AT INTERIOR MIRROR ASSEMBLY

(71) Applicant: Magna Mirrors of America, Inc., Holland, MI (US)

(72) Inventor: Michael J. Baur, Kentwood, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 18 days.

(21) Appl. No.: 18/603,406

(22) Filed: Mar. 13, 2024

(65) Prior Publication Data

US 2024/0308427 A1 Sep. 19, 2024

Related U.S. Application Data

(60) Provisional application No. 63/490,293, filed on Mar. 15, 2023.

(51) Int. Cl.
*B60R 1/29* (2022.01)
*B60R 1/08* (2006.01)
(Continued)

(52) U.S. Cl.
CPC ............... *B60R 1/29* (2022.01); *B60R 1/087* (2013.01); *B60R 1/1207* (2013.01); *B60R 11/00* (2013.01); *B60R 2001/1253* (2013.01); *B60R 2001/1276* (2013.01); *B60R 2011/0019* (2013.01); *B60R 2011/0028* (2013.01); *B60R 2300/101* (2013.01); *B60R 2300/103* (2013.01); *B60R 2300/8006* (2013.01)

(58) Field of Classification Search
CPC ......... B60R 1/29; B60R 1/087; B60R 1/1207; B60R 11/00; B60R 2001/1253; B60R 2001/1276; B60R 2011/0019; B60R 2011/0028; B60R 2300/101; B60R 2300/103; B60R 2300/8006; B60R 1/04; B60R 1/12

See application file for complete search history.

(56) References Cited

U.S. PATENT DOCUMENTS

| | | |
|---|---|---|
| 10,017,114 B2 | 7/2018 | Bongwald |
| 10,046,706 B2 | 8/2018 | Larson et al. |

(Continued)

*Primary Examiner* — Sath V Perungavoor
*Assistant Examiner* — Tyler B Edwards
(74) *Attorney, Agent, or Firm* — HONIGMAN LLP (57) ABSTRACT

A vehicular cabin monitoring system includes an interior rearview mirror assembly having a mirror head adjustable relative to a mounting structure. A camera is accommodated by and moves with the mirror head when the mirror head is adjusted. A first subset of image data captured by the camera is processed for monitoring the driver of the vehicle. A spectrally reflecting mirror element is disposed within the interior cabin and spaced from the rearview mirror. The mirror element spectrally reflects light toward the camera that is representative of an obstructed region within the interior cabin not directly viewable by the camera. The mirror element is disposed at an accessory module of the vehicle. A second subset of image data is representative of light reflected from the mirror element. The cabin monitoring system determines presence of an object within the obstructed region based on processing of the second subset of image data.

27 Claims, 2 Drawing Sheets

(51) Int. Cl.
*B60R 1/12* (2006.01)
*B60R 11/00* (2006.01)

(56) References Cited

U.S. PATENT DOCUMENTS

| | | | |
|---|---|---|---|
| 10,065,574 B2 | 9/2018 | Tiryaki | |
| 10,324,297 B2 | 6/2019 | Kunze | |
| 10,442,360 B2 | 10/2019 | LaCross et al. | |
| 10,958,830 B2 | 3/2021 | Koravadi | |
| 11,465,561 B2 | 10/2022 | Peterson et al. | |
| 11,518,401 B2 | 12/2022 | Kulkarni | |
| 11,582,425 B2 | 2/2023 | Liu | |
| 11,639,134 B1 | 5/2023 | Huizen et al. | |
| 11,648,956 B2 | 5/2023 | Caron et al. | |
| 11,780,372 B2 | 10/2023 | Sobecki et al. | |
| 11,827,153 B2 | 11/2023 | Miller et al. | |
| 2006/0186651 A1* | 8/2006 | Aoki | B60R 21/01538 280/735 |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2018/0222414 A1 | 8/2018 | Ihlenburg et al. | |
| 2018/0231976 A1 | 8/2018 | Singh | |
| 2019/0118717 A1 | 4/2019 | Blank et al. | |
| 2019/0210615 A1 | 7/2019 | Caron et al. | |
| 2020/0143560 A1 | 5/2020 | Lu et al. | |
| 2020/0202151 A1 | 6/2020 | Wacquant | |
| 2020/0320320 A1 | 10/2020 | Lynam | |
| 2021/0155167 A1 | 5/2021 | Lynam et al. | |
| 2021/0162926 A1 | 6/2021 | Lu | |
| 2021/0245662 A1 | 8/2021 | Blank et al. | |
| 2021/0291739 A1 | 9/2021 | Kasarla et al. | |
| 2021/0323473 A1 | 10/2021 | Peterson et al. | |
| 2022/0242438 A1 | 8/2022 | Sobecki et al. | |
| 2022/0254132 A1 | 8/2022 | Rother | |
| 2022/0377219 A1 | 11/2022 | Conger et al. | |
| 2024/0064274 A1 | 2/2024 | Blank et al. | |
| 2024/0168355 A1 | 5/2024 | Baur | |
| 2024/0190456 A1 | 6/2024 | P et al. | |
| 2024/0217437 A1 | 7/2024 | LaCross | |
| 2024/0223734 A1 | 7/2024 | Sobecki et al. | |
| 2024/0233511 A1 | 7/2024 | Golbon Haghighi et al. | |
| 2024/0242513 A1 | 7/2024 | Huizen et al. | |
| 2024/0383406 A1 | 11/2024 | Sobecki | |

\* cited by examiner

VEHICULAR DRIVER MONITORING SYSTEM WITH CAMERA AT INTERIOR MIRROR ASSEMBLY

CROSS REFERENCE TO RELATED APPLICATION

The present application claims the filing benefits of U.S. provisional application Ser. No. 63/490,293, filed Mar. 15, 2023, which is hereby incorporated herein by reference in its entirety.

FIELD OF THE INVENTION

The present invention relates generally to a vehicular driver or occupant or cabin monitoring system for a vehicle and, more particularly, to a vehicular driver or occupant or cabin monitoring system that utilizes one or more cameras at an interior mirror of a vehicle.

BACKGROUND OF THE INVENTION

It is known to provide a mirror assembly that is adjustably mounted to an interior portion of a vehicle, such as via a single or double ball pivot or joint mounting configuration where the mirror casing and mirror reflective element are adjusted relative to the interior portion of a vehicle by pivotal movement about the single or double ball pivot configuration. The mirror casing and reflective element are pivotable about one or two ball pivot joints by a user that is adjusting a rearward field of view of the reflective element.

SUMMARY OF THE INVENTION

An interior rearview mirror assembly accommodates a camera and an infrared (IR) or near infrared (near IR) light emitter of a driver monitoring system (DMS) or occupant monitoring system (OMS). The camera and light emitter are accommodated within the mirror head of the interior rearview mirror assembly such that the camera may view through the mirror reflective element and collect image data representative of light that passes through the mirror reflective element and the light emitter may emit light through the mirror reflective element to illuminate at least a portion of the vehicle cabin. Optionally, the mirror head accommodates processing circuitry for the DMS/OMS and/or a video display screen for displaying video images generated by a camera monitoring system (CMS) of the vehicle to a driver of the vehicle. So that the camera may view portions of the vehicle cabin that may otherwise be obstructed from the camera's direct field of view, one or more mirrors or reflective elements may be disposed within the vehicle cabin and within the camera's field of view so that the camera may view portions of the vehicle cabin via reflection from the one or more mirrors or reflective elements.

For example, a vehicular cabin monitoring system includes an interior rearview mirror assembly that includes a mirror head adjustably attached to a mounting structure. The mounting structure is configured to attach at an interior portion of a cabin of the vehicle equipped with the cabin monitoring system. The mirror head includes a mirror reflective element. A camera accommodated by the mirror head is movable together and in tandem with the mirror head when the mirror head is adjusted relative to the mounting structure when a driver of the vehicle sets a preferred rearward view provided by the mirror reflective element. An electronic control unit (ECU) includes electronic circuitry and associated software, including an image processor for processing image data captured by the camera. One or more reflectors are disposed at the cabin of the vehicle and spaced from the interior rearview mirror assembly. With the mounting structure attached at the interior portion of the vehicle, the camera views the reflector and captures image data representative of light reflected by the reflector. With the mounting structure attached at the interior portion of the vehicle, image data captured by the camera and representative of light reflected by the reflector is processed at the ECU for a cabin monitoring function.

These and other objects, advantages, purposes and features of the present invention will become apparent upon review of the following specification in conjunction with the drawings.

DESCRIPTION OF THE PREFERRED EMBODIMENTS

Figure 1:
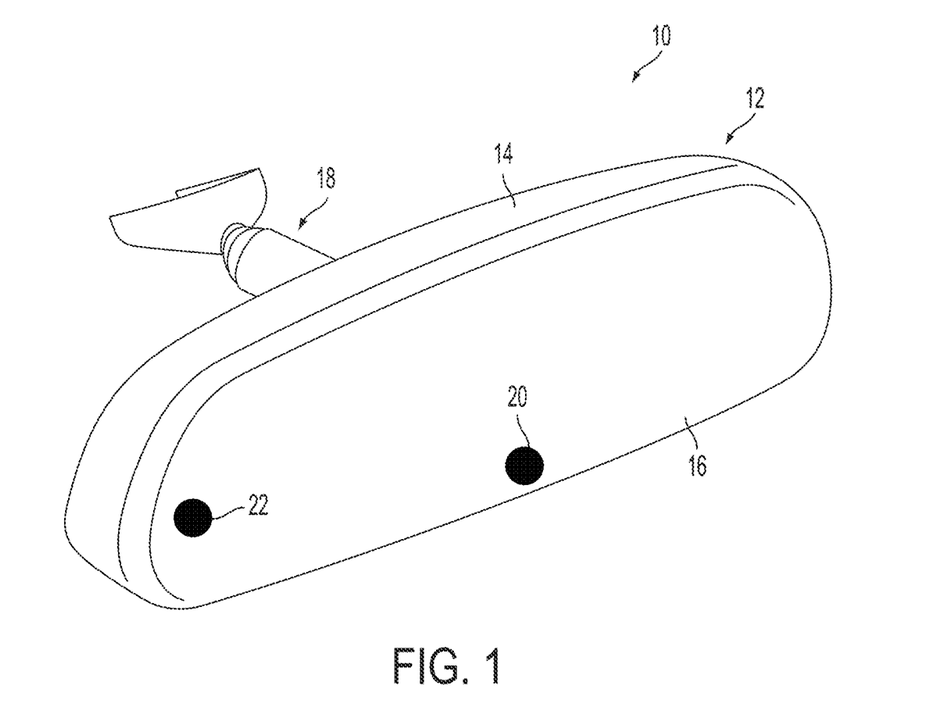
FIG. 1 is a perspective view of an interior rearview mirror assembly.
Figure 2:
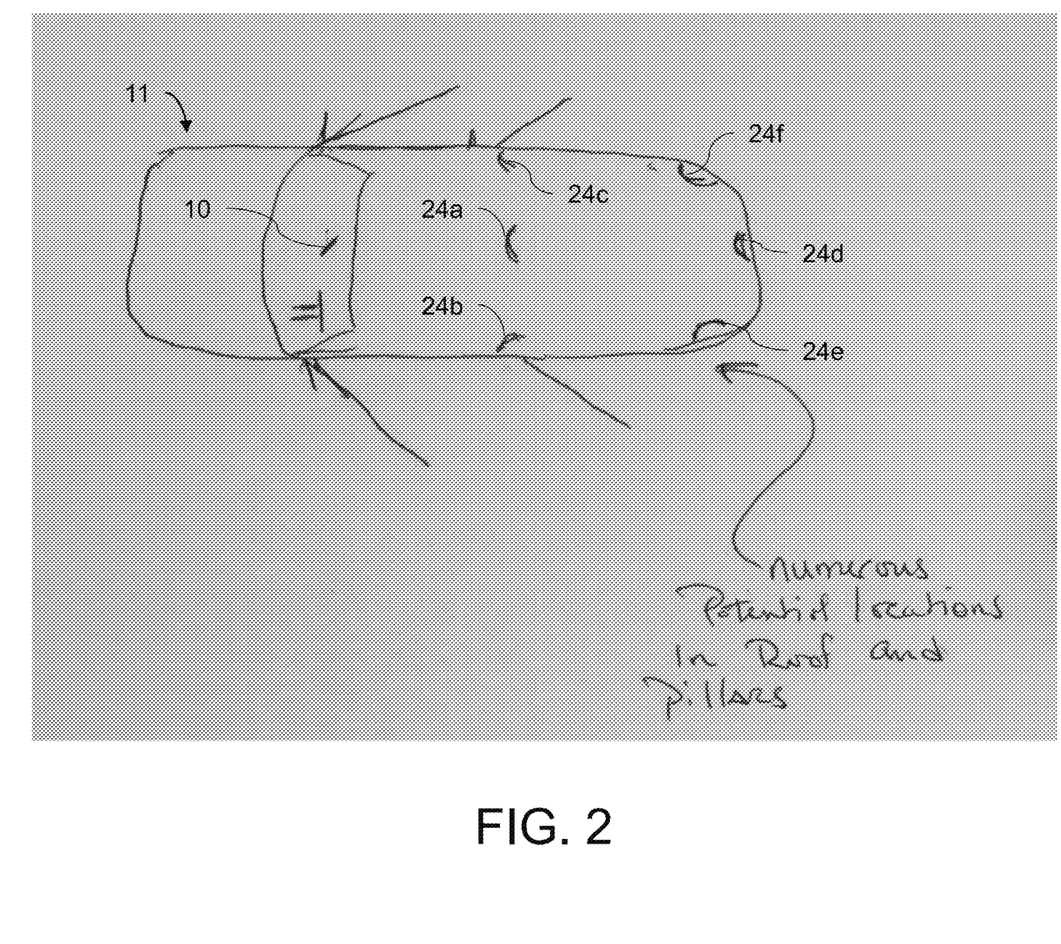
FIG. 2 is a plan view of a vehicle equipped with the interior rearview mirror assembly and a plurality of mirrors disposed throughout the vehicle.

Referring now to the drawings and the illustrative embodiments depicted therein, an interior rearview mirror assembly 10 for a vehicle 11 includes a mirror head 12 having a casing 14 and a reflective element 16 positioned at a front portion of the casing 14 (FIGS. 1 and 2). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element 16 may comprise a variable reflectance mirror reflective element that varies its reflectance responsive to electrical current applied to conductive coatings or layers of the reflective element.

The mirror assembly 10 includes or is associated with a driver monitoring system (DMS) and/or an occupant monitoring system (OMS), with the mirror assembly comprising a driver/occupant monitoring camera 20 disposed at a back plate (and viewing through an aperture of the back plate) behind the reflective element 16 and viewing through the reflective element 16 toward at least a head region of the driver of the vehicle. The DMS includes an infrared light (IR light) or near infrared light (near IR light) emitter 22 disposed at the back plate and emitting IR light or near IR light that passes through another aperture of the back plate and through the reflective element 16. Further, the monitoring system includes an electronic control unit (ECU) having electronic circuitry and associated software, including an image processor for processing image data captured by the DMS/OMS camera. The monitoring system may utilize aspects of driver monitoring systems or occupant monitoring systems described in U.S. Publication Nos. US-2022-0377219; US-2022-0254132; US-2022-0242438; US-2021-0323473 and/or US-2021-0291739, and/or U.S. patent application Ser. No. 18/508,351, filed Nov. 14, 2023, which published on May 23, 2024 as U.S. Patent Publication No. 2024-0168355, Ser. No. 18/535,183, filed Dec. 11, 2023, which published on Jun. 13, 2024 as U.S. Patent Publication No. 2024-0190456, Ser. No. 18/544,493, filed Dec. 19, 2023, now U.S. Pat. No. 12,342,106, Ser. No. 18/390,166, filed Dec. 20, 2023, now U.S. Pat. No. 12,304,391, and/or Ser. No. 18/413,302, filed Jan. 16, 2024, which published on Jul. 18, 2024 as U.S. Patent Publication Nos. 2024-0242513, and/or International Publication Nos. WO 2023/220222; WO 2023/034956; WO 2022/241423 and/or WO 2022/187805, which are all hereby incorporated herein by reference in their entireties.

With the DMS camera 20 disposed in the mirror head 12, the camera 20 moves together and in tandem with the mirror head 12 (including the mirror casing 14 and mirror reflective element 16 that pivot at a pivot joint that pivotally connects the mirror head to the mounting structure 18 of the interior rearview mirror assembly that in turn mounts at a windshield or at a headliner of the equipped vehicle), such that, when the driver aligns the mirror head 12 to view rearward, the camera 20 is positioned so as to view at least the driver of the vehicle. The location of the DMS camera 20 and IR LED(s) 22 at the mirror head 12 provide an unobstructed view to the driver. The driver monitoring camera 20 may also provide captured image data for a cabin monitoring system or occupancy monitoring system (OMS) or another separate OMS camera may be disposed at the mirror assembly for the OMS function.

Typically, a vehicle equipped with a cabin monitoring system may include a plurality of cameras disposed at different positions within the vehicle cabin to view different portions of the vehicle cabin. That is, vehicles may include many cameras that capture different views of the vehicle in order to effectively monitor the vehicle cabin. However, including additional cameras in the vehicle increases costs, wiring complexity and installation difficulty.

The camera 20 disposed at the interior rearview mirror assembly 10 may have a field of view of the interior cabin of the vehicle that includes the driver head region, the driver seat position, the passenger seat position and/or at least a portion of rear passenger seat positions within the vehicle. However, due to obstructions in the camera's field of view (e.g., vehicle seats, occupants, an overhead console module, a center console and the like), the field of view may not include other regions or portions of the interior cabin of the vehicle. That is, the camera 20 is unable to directly view other areas within the vehicle cabin, such as foot well regions, a rear cargo region and the like. In other words, a mirror-based camera in the vehicle (i.e., a camera disposed at the interior rearview mirror assembly) has a field of view that captures a significant amount of cabin view, but it naturally has blind spots due to seats, occupants and the like.

As discussed further below, one or more mirrors or reflective elements or reflectors or spectrally reflecting mirror elements 24 are disposed in the cabin of the vehicle 11 and within the field of view of the camera 20 so that the camera 20 disposed at the interior rearview mirror assembly 10 may view one or more areas or regions within the vehicle via reflections provided by the one or more mirrors 24. That is, the camera 20 may view regions or portions of the interior cabin of the vehicle that are not in the field of view of the camera 20 by viewing the reflections at the one or more mirrors 24 that are in the field of view of the camera 20. For example, and as shown in FIG. 2, a first mirror 24a may be disposed along the headliner or roofline of the vehicle at a central portion of the vehicle and behind the driver and passenger seat. A second mirror 24b and a third mirror 24c may be disposed at or near respective B-pillars at the driver side and passenger side of the vehicle (such as at or near the roofline or headliner of the vehicle). A fourth mirror 24d may be disposed along the headliner or roofline of the vehicle at a central rear portion of the vehicle and behind the rear seat positions, such as along the headliner and above a rear window of the vehicle. A fifth mirror 24e and a sixth mirror 24f may be disposed at or near respective C-pillars (and/or D-pillars) of the vehicle (such as at or near the roofline or headliner of the vehicle). The one or more mirrors may be disposed at any suitable position within the vehicle cabin, such as at a seat headrest (e.g., a side of the seat headrest), a grab-handle area, a dome light or reading light module, a moonroof or sunroof or panoramic roof or frame, a door panel, a liftgate, a sun visor, and the like.

Via the reflection of one or more of the mirrors 24, the camera 20 may view one or more regions or portions of the vehicle cabin that are outside of the unobstructed or direct field of view of the camera 20. For example, by viewing the reflection of one or more mirrors, the camera 20 may view a driver seat foot well, a front passenger seat foot well, rear passenger seat foot wells, rear passenger seat positions, respective hand positions of the driver and/or passenger, a rear cargo area, child seats in rear passenger seat positions, and the like. Thus, the cabin monitoring system may process image data captured by the camera to determine body pose of the driver and occupants (such as to determine driver distractions), to perform seat belt recognition, to perform child monitoring, to determine airbag deployment and the like.

Put another way, the mirrors 24 are positioned within the interior cabin of the vehicle so that, when the interior rearview mirror is adjusted to provide a rearward field of view to the driver, the camera 20 at the interior rearview mirror views one or more of the mirrors 24. The camera 20 may directly view the driver head region and/or front passenger region of the interior cabin of the vehicle for the DMS and/or OMS of the vehicle, such that the driver head region and the front passenger region are in a primary field of view of the camera. One or more of the mirrors 24 may also be in the primary field of view of the camera 20 and the mirror 24 is configured or oriented relative to the interior rearview mirror and the camera 20 so that the camera 20 views a region of the interior cabin of the vehicle that is not within the primary field of view of the camera 20 (e.g., because of an obstruction between the camera and the portion of the cabin) via the reflections at the mirrors 24. For example, the first mirror 24a, the second mirror 24b and the third mirror 24c may all be angled at least partially downward to direct reflections toward the camera 20 representative of the driver foot well region and/or the passenger foot well region. Thus, as the interior rearview mirror is adjusted, the camera 20 may view the driver foot well region and/or the passenger foot well region by viewing reflections at one or more of the first mirror 24a, the second mirror 24b and the third mirror 24c.

The one or more mirrors 24 may be shaped or otherwise configured to provide the desired field of view. For example, the mirrors may be planar, concave or convex based on the position of the mirror within the vehicle relative to the camera 20 and the desired viewing area of the camera 20 when viewing the mirror. Further, an electronic control unit (ECU) (that includes processing circuitry and associated software, including an image processor for processing image data captured by the camera) associated with the DMS, OMS and/or CMS may process the captured image data based on the curvature or configuration of the mirror 24 to understand and/or correct for and/or accommodate any warping or distortion caused by the curvature or configuration of the mirror 24.

Optionally, the mirror assembly 10 may comprise a position sensor for detecting the position of the mirror head 12 relative to the mounting structure 18 as the driver adjusts the mirror head to set the rearward field of view provided to the driver by the mirror reflective element 16. For example, the mirror assembly may include characteristics of the mirror assemblies described in U.S. patent application Ser. No. 18/544,493, filed Dec. 19, 2023, now U.S. Pat. No. 12,342,106, which is hereby incorporated herein by reference in its entirety. Based on the detected position of the mirror head, the system may determine the position of one or more of the mirrors 24 relative to the camera 20 and thus determine or estimate a position of the mirror 24 within the captured image data. That is, the system may determine that a portion of captured image data is representative of reflections from the mirror 24 based on the determined position of the mirror head and the determined position of the mirror 24 relative to the mirror head.

Further, based on the determined position of the mirror 24 within the captured image data, the system may determine the portion of the interior cabin viewed via reflections from the mirror 24. That is, each respective mirror 24 may correspond to one or more portions or regions of the interior cabin of the vehicle, such that the system determines the region of the interior cabin corresponding to the portion of captured image data based on the mirror 24 being viewed within that portion of the captured image data. For example, based on determining the position of the first mirror 24*a* within the captured image data, the system determines that the portion of the captured image data corresponding to the first mirror 24*a* is representative of the driver foot well region and/or passenger foot well region of the vehicle.

Therefore, the camera 20 captures image data representative of light reflected from the one or more mirrors 24. The camera 20 may capture image data representative of visible light reflected from the one or more mirrors 24. Optionally, the camera 20 captures image data representative of near IR or IR light reflected from the one or more mirrors 24. The cabin may be illuminated with near IR or IR light via the light emitter 22 at the interior rearview mirror assembly 10. Optionally, one or more near IR or IR light emitters may be disposed at or near one or more of the mirrors 24 (i.e., at an accessory module that accommodates a respective mirror 24). For example, the light emitter may be disposed behind the mirror 24 and, when electrically operated to emit light, the light emitter emits light that passes through the mirror 24 to illuminate the portion of the vehicle cabin. Thus, the mirror 24 may be configured to transmit at least a portion of the near IR or IR light emitted from the light emitter through the mirror 24 and the mirror may be configured to reflect at least a portion of the near IR light incident at the outer surface of the mirror 24 to be captured as image data by the camera 20. Optionally, the light emitter may be disposed at a window or non-reflective part of the mirror or may be disposed at a bezel or frame portion of the mirror 24 and operable to emit light to illuminate the cabin region that is reflected toward the camera.

The near IR or IR light emitter may be disposed at any suitable position within the vehicle cabin, such as along the headliner, one or more of the A-pillar, B-pillar, C-pillar and/or D-pillar of the vehicle and the like. Optionally, the mirror 24 and/or one or more near IR or IR light emitters may be disposed at or integrated with a vehicle accessory or feature, such as a dome light, a reading light, a grab handle area, a head rest, a speaker, a microphone, and the like. Thus, the mirror 24 and/or the light emitter may electrically connect to a power source of the vehicle via the vehicle wire harness at an existing connection for the vehicle accessory. In other words, the light emitter and the vehicle accessory may connect to the vehicle wire harness via a common electrical connector. The system may control operation of the light emitter and the mirror via a controller or ECU of the vehicle that also controls operation of the DMS camera. Thus, the system may control operation of the light emitter in conjunction with the DMS camera so that the frame capture rate of the DMS camera is synchronized with a pulse rate of the light emitter.

In some examples, the mirror 24 may be configured to reflect only near IR light or IR light (or configured to reflect only a small portion of visible light), such that the mirror 24 is covert or hidden from view of the driver. For example, a light transmissive coating may be disposed at the outer surface of the mirror 24 that reflects at least a portion of the near IR or IR light incident thereupon and that absorbs a portion of the visible light incident thereupon. For example, the light transmissive coating may be darkened or dimmed such that the mirror 24 blends in with a headliner or panoramic roof of the vehicle.

Optionally, the mirror 24 may comprise an electrically dimmable mirror element, such that the mirror 24 may be electrically charged or powered to adjust the reflectance of the mirror 24. Thus, the mirror 24 may be darkened or dimmed when the camera is not capturing image data representative of the view provided by the mirror (such as to render the mirror covert to the driver of the vehicle and so that the camera does not view reflections from the mirror) and the mirror may be operated to reflect light for viewing by the camera when the camera is operated to capture image data. For example, the reflector may include an electrically dimmable medium that is adjustable between a first light transmitting state, where the reflector has a first level of light reflectance, and a second light transmitting state, where the reflector has a second level of light reflectance, where the first level of light reflectance is greater than the second level of light reflectance. The electrically dimmable medium may be at the first light transmitting state when the camera is capturing image data, and the electrically dimmable medium may be at the second light transmitting state when the camera is not capturing image data. Optionally, the mirror may be adjusted between operating in the first light transmitting state and the second light transmitting state to allow the camera to selectively view the obstructed region via the reflections provided by the mirror 24, such as based on detection of an object or passenger in the obstructed region or based on a user input to view the obstructed region.

For example, the mirror may be dimmable via electro-optic technology, such as, for example, liquid crystal (LC) technology or electrochromic (EC) technology or the like. For example, the mirror may comprise an inner glass panel and an outer glass panel with an electrochromic medium sandwiched therebetween. The mirror may be darkenable via electrical current being applied to transparent conductive coatings at the inner and outer glass panels (such as by utilizing dimming aspects and touch/proximity sensor aspects of the electro-optic mirror reflective elements described in U.S. Pat. Nos. 9,598,016; 9,346,403; 7,626,749; 7,274,501; 7,184,190 and/or 7,255,451, which are hereby incorporated herein by reference in their entireties). Optionally, the plurality of mirrors disposed at the vehicle may be individually operable to reflect light based on a desired field of view of the cabin monitoring system. For example, to provide a child monitoring system for a particular rear passenger seat, a mirror corresponding to the seat position may be activated while the remaining mirrors are dimmed or darkened. Optionally, image processing of image data captured by the camera may be adjusted to primarily process particular regions of the field of view of the camera (that correspond to particular mirror reflectors) depending on the particular function of the cabin monitoring system.

In some examples, the electrically dimmable mirror may be electrically operated to reflect light (i.e., not-dimmed or not-darkened or operated to have a greater light reflectance) based on initial detection of an object or passenger within the portion of the cabin corresponding to the mirror. For example, upon vehicle startup, each mirror may be operated to reflect light toward the camera so that the system may determine presence of objects and/or passengers at regions of the interior cabin. Based on detection of an object and/or passenger at one region, the mirror corresponding to that region may remain in its higher reflective state (i.e., remain operating to have greater light reflectance), while the other mirrors are operated to a reduced reflective state (i.e., dimmed or darkened to have lower light reflectance). Operation of the electrically dimmable mirrors may be triggered based on detection of the objects and/or passengers via other suitable inputs, such as a sensor in the seat or seatbelt clasp detecting presence of the passenger. Further, the electrically dimmable mirrors may be operated to have the greater level of light reflectance to direct reflections toward the camera based on a user input, such as a user input to operate a child monitoring system.

One or more vehicle accessories or features may be disposed at or near the mirror 24 (such as to electrically connect the vehicle accessory and the light emitter of the mirror at the same point of the vehicle wire harness). For example, an audio speaker, a microphone (e.g., for a communications system of the vehicle), a charge port for portable electronics (e.g., a 120V outlet or a USB outlet for a mobile device) and the like may be disposed at or near or integrated with the mirror 24.

Furthermore, the mirrors 24 may be integrated with lighting features, logos and the like to provide an elegant integrated solution. For example, the mirror 24 may be integrated with a light source to provide a reading light at the grab handle region of the vehicle and a logo or icon may be etched or engraved into the outer surface of the mirror.

Therefore, in lieu of additional cameras, mirrors may be installed in the vehicle cabin and these mirrors allow the camera disposed at the interior rearview mirror assembly to view what would naturally be blind spots. These mirrors may be tailored with different geometries to achieve the desired field of view. Optionally, the mirrors may allow the driver to view these blind spots by viewing the mirror reflective element of the rearview mirror. Thus, the one or more mirrors replace multiple cameras with the single mirror based camera. In order to see at night or other dim lighting conditions, the mirrors may also contain IR light emitters properly aimed to provide IR cabin illumination. Optionally, the one or more IR emitters may be located in other vehicle features. The mirrors may be integrated with lighting features, logos, and the like to provide an elegant integrated solution. Other features may include charge ports for portable electronics, audio speakers, microphones and the like.

The mirror assembly may comprise an auto-dimming mirror reflective element (e.g., an electrochromic mirror reflective element) or a prismatic mirror reflective element. For a prismatic mirror, when the head or housing is set to a particular orientation by the driver of an equipped vehicle, a toggle operable by the driver moves the housing and reflective element to flip upward/downward, typically by about 4 degrees, to switch between a daytime or non-glare reducing position (where the driver views reflections at the mirror reflector of the mirror reflective element) and a nighttime or glare reducing position (where the driver views reflections at the surface of the glass substrate of the mirror reflective element). With the auto-dimming mirror, there is typically no movement once the mirror head is set for the particular driver.

Both types of mirrors may be provided with a video display screen that is disposed behind and is viewable through the mirror reflective element. Such video mirrors include a backlit LCD display screen, and a particular form of video mirror is a full display mirror (such a ClearView™ Interior Rearview Mirror Assembly available from Magna Mirrors of America, Inc. of Holland, MI USA, or an FDM™ Interior Rearview Mirror Assembly available from Gentex Corporation of Zeeland, MI USA), where the video display screen fills the reflective region, such as by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2019-0258131; US-2019-0146297; US-2019-0118717 and/or US-2017-0355312, which are all hereby incorporated herein by reference in their entireties. In that type of a dual-mode interior rearview mirror, the EC mirror head moves when switching from a traditional reflection mode or mirror mode to a live-video display mode. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

The mirror assembly includes a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,582,425; 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/508,351, filed Nov. 14, 2023, which published on May 23, 2024 as U.S. Patent Publication No. 2024-0168355, and/or U.S. patent application Ser. No. 18/535,183, filed Dec. 11, 2023, which published on Jun. 13, 2024 as U.S. Patent Publication No. 2024- 0190456, and/or International Publication Nos. WO 2023/220222; WO 2023/034956; WO 2022/241423 and/or WO 2022/187805, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular cabin monitoring system, the vehicular cabin monitoring system comprising:

an interior rearview mirror assembly comprising a mirror head adjustable relative to a mounting structure, wherein the mounting structure is configured to attach at a first interior portion of an interior cabin of a vehicle equipped with the vehicular cabin monitoring system to mount the interior rearview mirror assembly within the interior cabin of the vehicle, and wherein the mirror head comprises a mirror reflective element;

a camera accommodated by the mirror head, wherein, with the interior rearview mirror assembly mounted within the interior cabin of the vehicle, the camera moves together and in tandem with the mirror head when the mirror head is adjusted relative to the mounting structure, and wherein the camera is operable to capture image data;

an electronic control unit (ECU);

wherein image data captured by the camera is transferred to the ECU;

wherein the ECU comprises electronic circuitry and associated software, and wherein the electronic circuitry of the ECU comprises an image processor operable to process image data captured by the camera;

wherein a first subset of the image data captured by the camera is representative of a head of a driver of the vehicle, and wherein at least the first subset of the image data captured by the camera is processed at the ECU for monitoring of the driver of the vehicle;

a spectrally reflecting mirror element disposed within the interior cabin of the vehicle and spaced from the interior rearview mirror assembly, wherein the spectrally reflecting mirror element spectrally reflects light toward the camera that is representative of at least a portion of light incident at an obstructed region within the interior cabin of the vehicle, and wherein the obstructed region within the interior cabin of the vehicle is remote from the head of the driver and is not directly viewable by the camera;

wherein the spectrally reflecting mirror element is disposed at an accessory module of the vehicle, and wherein the accessory module attaches at a second interior portion of the interior cabin of the vehicle to dispose the spectrally reflecting mirror element within the interior cabin of the vehicle;

wherein a second subset of the image data captured by the camera is representative of light reflected from the spectrally reflecting mirror element, and wherein the second subset of the image data captured by the camera is different from the first subset of the image data captured by the camera; and wherein the vehicular cabin monitoring system, based on processing at the ECU of at least the second subset of the image data captured by the camera, determines presence of an object within the obstructed region within the interior cabin of the vehicle.

2. The vehicular cabin monitoring system of claim 1, wherein the camera captures image data representative of visible light reflected by the spectrally reflecting mirror element.

3. The vehicular cabin monitoring system of claim 1, wherein the camera captures image data representative of near infrared (near IR) light reflected by the spectrally reflecting mirror element.

4. The vehicular cabin monitoring system of claim 3, wherein a near IR light emitter is accommodated by the mirror head, and wherein the near IR light emitter is electrically operable to emit near IR light that illuminates at least a portion of the interior cabin of the vehicle.

5. The vehicular cabin monitoring system of claim 3, wherein the accessory module accommodates a near IR light emitter, and wherein the near IR light emitter is electrically operable to emit near IR light that illuminates the obstructed region within the interior cabin of the vehicle.

6. The vehicular cabin monitoring system of claim 5, wherein the accessory module accommodates an electronic accessory of the vehicle, and wherein, with the accessory module attached at the second interior portion of the interior cabin of the vehicle, the electronic accessory and the near IR light emitter electrically connect to a power source of the vehicle via a common electrical connector of the accessory module.

7. The vehicular cabin monitoring system of claim 5, wherein the vehicular cabin monitoring system synchronizes operation of the near IR light emitter and the camera.

8. The vehicular cabin monitoring system of claim 3, wherein a near IR light emitter is disposed at one selected from the group consisting of (i) a reading light module of the vehicle that is remote from the accessory module of the vehicle and (ii) a dome light module of the vehicle that is remote from the accessory module of the vehicle.

9. The vehicular cabin monitoring system of claim 1, wherein the accessory module accommodates a speaker of an audio system of the vehicle.

10. The vehicular cabin monitoring system of claim 1, wherein the accessory module accommodates an interior light source of the vehicle.

11. The vehicular cabin monitoring system of claim 1, wherein the accessory module accommodates a grab handle of the vehicle.

12. The vehicular cabin monitoring system of claim 1, wherein the accessory module and the spectrally reflecting mirror element are disposed along a headliner of the vehicle.

13. The vehicular cabin monitoring system of claim 1, wherein the obstructed region comprises at least one selected from the group consisting of (i) a rear passenger seat region of the interior cabin of the vehicle, (ii) a rear passenger foot well region of the interior cabin of the vehicle and (iii) a rear cargo area of the interior cabin of the vehicle.

14. The vehicular cabin monitoring system of claim 1, wherein the spectrally reflecting mirror element comprises an electrically dimmable mirror reflective element, and wherein the electrically dimmable mirror reflective element is electrically operable between at least (i) a first reflective state, where the electrically dimmable mirror reflective element has a first level of reflectance, and (ii) a second reflective state, where the electrically dimmable mirror reflective element has a second level of reflectance, and wherein the first level of reflectance is greater than the second level of reflectance.

15. The vehicular cabin monitoring system of claim 14, wherein, based on the vehicular cabin monitoring system determining presence of the object within the obstructed region within the interior cabin of the vehicle, the electrically dimmable mirror reflective element is electrically operated in the first reflective state, and wherein, based on the vehicular cabin monitoring system determining absence of the object within the obstructed region within the interior cabin of the vehicle, the electrically dimmable mirror reflective element is electrically operated in the second reflective state.

16. The vehicular cabin monitoring system of claim 1, wherein the accessory module comprises an electronic accessory of the vehicle, and wherein, with the accessory module attached at the second interior portion of the interior cabin of the vehicle, the electronic accessory electrically connects to a power source of the vehicle.

17. A vehicular cabin monitoring system, the vehicular cabin monitoring system comprising:
an interior rearview mirror assembly comprising a mirror head adjustable relative to a mounting structure, wherein the mounting structure is configured to attach at a first interior portion of an interior cabin of a vehicle equipped with the vehicular cabin monitoring system to mount the interior rearview mirror assembly within the interior cabin of the vehicle, and wherein the mirror head comprises a mirror reflective element;
a camera accommodated by the mirror head, wherein, with the interior rearview mirror assembly mounted within the interior cabin of the vehicle, the camera moves together and in tandem with the mirror head when the mirror head is adjusted relative to the mounting structure, and wherein the camera is operable to capture image data representative of near infrared (near IR) light;
an electronic control unit (ECU);
wherein image data captured by the camera is transferred to the ECU;
wherein the ECU comprises electronic circuitry and associated software, and wherein the electronic circuitry of the ECU comprises an image processor operable to process image data captured by the camera;
wherein a first subset of the image data captured by the camera is representative of a head of a driver of the vehicle, and wherein at least the first subset of the image data captured by the camera is processed at the ECU for monitoring of the driver of the vehicle;
a spectrally reflecting mirror element disposed within the interior cabin of the vehicle and spaced from the interior rearview mirror assembly, wherein the spectrally reflecting mirror element spectrally reflects near IR light toward the camera that is representative of at least a portion of near IR light incident at an obstructed region within the interior cabin of the vehicle, and wherein the obstructed region within the interior cabin of the vehicle is remote from the head of the driver and is not directly viewable by the camera;
wherein the spectrally reflecting mirror element is disposed at an accessory module of the vehicle, and wherein the accessory module attaches at a second interior portion of the interior cabin of the vehicle to dispose the spectrally reflecting mirror element within the interior cabin of the vehicle;
wherein the accessory module accommodates a near IR light emitter, and wherein the near IR light emitter is electrically operable to emit near IR light;
wherein, when the near IR light emitter is electrically operated to emit near IR light, near IR light emitted by the near IR light emitter passes through the spectrally reflecting mirror element to illuminate the obstructed region within the interior cabin of the vehicle;
wherein a second subset of the image data captured by the camera is representative of near IR light reflected from the spectrally reflecting mirror element, and wherein the second subset of the image data captured by the camera is different from the first subset of the image data captured by the camera; and
wherein the vehicular cabin monitoring system, based on processing at the ECU of at least the second subset of the image data captured by the camera, determines presence of an object within the obstructed region within the interior cabin of the vehicle.

18. The vehicular cabin monitoring system of claim 17, wherein the accessory module accommodates an electronic accessory of the vehicle, and wherein, with the accessory module attached at the second interior portion of the interior cabin of the vehicle, the electronic accessory and the near IR light emitter electrically connect to a power source of the vehicle via a common electrical connector of the accessory module.

19. The vehicular cabin monitoring system of claim 17, wherein the vehicular cabin monitoring system synchronizes operation of the near IR light emitter and the camera.

20. The vehicular cabin monitoring system of claim 17, wherein the obstructed region comprises at least one selected from the group consisting of (i) a rear passenger seat region of the interior cabin of the vehicle, (ii) a rear passenger foot well region of the interior cabin of the vehicle and (iii) a rear cargo area of the interior cabin of the vehicle.

21. A vehicular cabin monitoring system, the vehicular cabin monitoring system comprising:
an interior rearview mirror assembly comprising a mirror head adjustable relative to a mounting structure, wherein the mounting structure is configured to attach at a first interior portion of an interior cabin of a vehicle equipped with the vehicular cabin monitoring system to mount the interior rearview mirror assembly within the interior cabin of the vehicle, and wherein the mirror head comprises a mirror reflective element;
a camera accommodated by the mirror head, wherein, with the interior rearview mirror assembly mounted within the interior cabin of the vehicle, the camera moves together and in tandem with the mirror head when the mirror head is adjusted relative to the mounting structure, and wherein the camera is operable to capture image data;
an electronic control unit (ECU);
wherein image data captured by the camera is transferred to the ECU;
wherein the ECU comprises electronic circuitry and associated software, and wherein the electronic circuitry of the ECU comprises an image processor operable to process image data captured by the camera;
wherein a first subset of the image data captured by the camera is representative of a head of a driver of the vehicle, and wherein at least the first subset of the image data captured by the camera is processed at the ECU for monitoring of the driver of the vehicle;
an electrically dimmable mirror reflective element disposed within the interior cabin of the vehicle and spaced from the interior rearview mirror assembly, wherein the electrically dimmable mirror reflective element reflects light toward the camera that is representative of at least a portion of light incident at an obstructed region within the interior cabin of the vehicle, and wherein the obstructed region within the interior cabin of the vehicle is remote from the head of the driver and is not directly viewable by the camera;
wherein the electrically dimmable mirror reflective element is disposed at an accessory module of the vehicle, and wherein the accessory module attaches at a second interior portion of the interior cabin of the vehicle to dispose the electrically dimmable mirror reflective element within the interior cabin of the vehicle;
wherein the accessory module comprises an electronic accessory of the vehicle, and wherein, with the accessory module attached at the second interior portion of the interior cabin of the vehicle, the electronic accessory and the electrically dimmable mirror reflective element electrically connect to a power source of the vehicle via a common electrical connector of the accessory module;
wherein the electrically dimmable mirror reflective element is electrically operable between at least (i) a first reflective state, where the electrically dimmable mirror reflective element has a first level of reflectance, and (ii) a second reflective state, where the electrically dimmable mirror reflective element has a second level of reflectance, and wherein the first level of reflectance is greater than the second level of reflectance;
wherein a second subset of the image data captured by the camera is representative of light reflected from the electrically dimmable mirror reflective element, and wherein the second subset of the image data captured by the camera is different from the first subset of the image data captured by the camera;
wherein the vehicular cabin monitoring system, based on processing at the ECU of at least the second subset of the image data captured by the camera, determines presence of an object within the obstructed region within the interior cabin of the vehicle; and
wherein, based on the vehicular cabin monitoring system determining presence of the object within the obstructed region within the interior cabin of the vehicle, the electrically dimmable mirror reflective element is electrically operated in the first reflective state.

22. The vehicular cabin monitoring system of claim 21, wherein the camera captures image data representative of visible light reflected by the electrically dimmable mirror reflective element.

23. The vehicular cabin monitoring system of claim 21, wherein the camera captures image data representative of near infrared (near IR) light reflected by the electrically dimmable mirror reflective element.

24. The vehicular cabin monitoring system of claim 23, wherein the accessory module accommodates a near IR light emitter, and wherein the near IR light emitter is electrically operable to emit near IR light that illuminates the obstructed region within the interior cabin of the vehicle.

25. The vehicular cabin monitoring system of claim 23, wherein a near IR light emitter is disposed at one selected from the group consisting of (i) a reading light module of the vehicle that is remote from the accessory module of the vehicle and (ii) a dome light module of the vehicle that is remote from the accessory module of the vehicle.

26. The vehicular cabin monitoring system of claim 21, wherein the obstructed region comprises at least one selected from the group consisting of (i) a rear passenger seat region of the interior cabin of the vehicle, (ii) a rear passenger foot well region of the interior cabin of the vehicle and (iii) a rear cargo area of the interior cabin of the vehicle.

27. The vehicular cabin monitoring system of claim 21, wherein, based on the vehicular cabin monitoring system determining absence of the object within the obstructed region within the interior cabin of the vehicle, the electrically dimmable mirror reflective element is electrically operated in the second reflective state.

\* \* \* \* \*